(12) United States Patent
Wu et al.

(10) Patent No.: US 7,944,795 B2
(45) Date of Patent: May 17, 2011

(54) HOLOGRAPHIC RECORDING MEDIUM AND ENCODING/DECODING METHOD THEREOF

(75) Inventors: Chun-Te Wu, Taoyuan County (TW); Chih-Hao Liu, Taichung (TW); Po-Chang Chen, Taipei County (TW); Chia-Hang Ho, Taipei (TW); Chien-Fu Tseng, Yunlin County (TW); Feng-Hsiang Lo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 502 days.

(21) Appl. No.: 12/179,583

(22) Filed: Jul. 25, 2008

(65) Prior Publication Data
US 2009/0238059 A1    Sep. 24, 2009

(30) Foreign Application Priority Data

Mar. 19, 2008   (TW) ................................ 97109712 A

(51) Int. Cl.
*G11B 7/00*    (2006.01)

(52) U.S. Cl. ................... 369/103; 369/47.21; 369/47.27; 369/53.29

(58) Field of Classification Search .................. None
See application file for complete search history.

(56) References Cited

U.S. PATENT DOCUMENTS

| 2005/0018263 | A1 | 1/2005 | Pharris | |
|---|---|---|---|---|
| 2005/0250046 | A1 | 11/2005 | Aoki et al. | |
| 2008/0239922 | A1* | 10/2008 | Fujita et al. | 369/103 |
| 2010/0232278 | A1* | 9/2010 | Ogasawara | 369/100 |

* cited by examiner

*Primary Examiner* — Muhammad N Edun
(74) *Attorney, Agent, or Firm* — Jianq Chyun IP Office

(57) ABSTRACT

A holographic recoding medium is provided, having holographic pages. Each page has reference mark (RM) placement areas at fixed locations for placing RM patterns. The reference marks are used to calibrate data images of data areas each of which is enclosed by at least three RM regions. Hidden information of the medium is stored by an specific encoded pattern based on existence, types and arrangements of the RM marks.

27 Claims, 5 Drawing Sheets

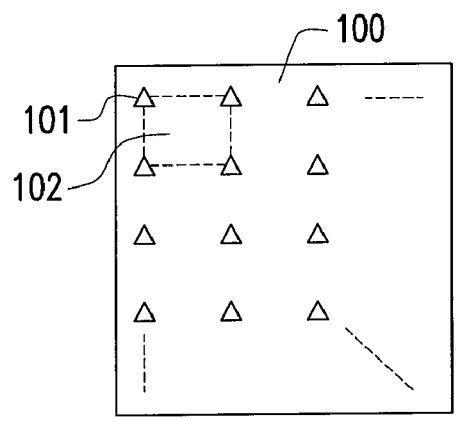
FIG. 3A
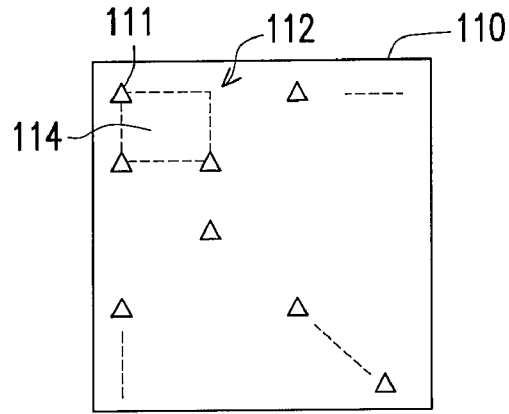
FIG. 3C
| 1 | 1 | 1 | ------- |
| 1 | 1 | 1 | ------- |
| 1 | 1 | 1 | ------- |
| ⋮ | ⋮ | ⋮ | |
| 1 | 1 | 1 | ------- |
FIG. 3B
| 1 | 0 | 1 | ------- |
| 1 | 1 | 0 | ------- |
| 0 | 1 | 0 | ------- |
| 1 | 0 | 1 | ------- |
| ⋮ | ⋮ | ⋮ | |
FIG. 3D
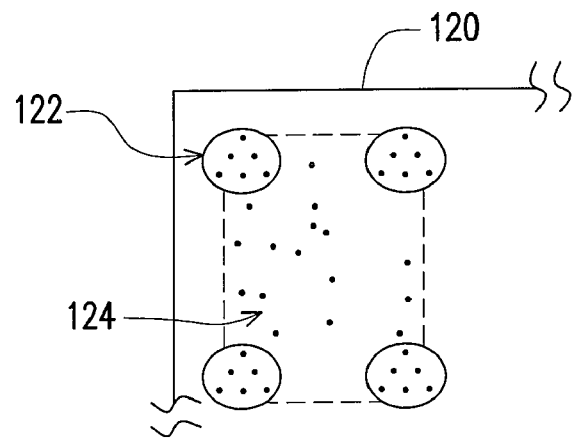
FIG. 3E

HOLOGRAPHIC RECORDING MEDIUM AND ENCODING/DECODING METHOD THEREOF

CROSS-REFERENCE TO RELATED APPLICATION

This application claims the priority benefit of Taiwan application serial no. 97109712, filed on Mar. 19, 2008. The entirety of the above-mentioned patent application is hereby incorporated by reference herein and made a part of this specification.

BACKGROUND OF THE INVENTION

1. Field of the Invention

The present invention generally relates to a structure of a recording medium. In particular, the present invention relates to an encoding structure of a holographic recording medium.

2. Description of Related Art

Along with the development of optical storage media, large capacity storage has been brought into reality due to the development of holographic techniques. The holographic storage technique uses two-dimensional images as a data access format, and is very different from ordinary optical storage operations and principles. The recording scheme for a holographic recording medium is based on a recording format composed of books and pages, in which a book comprises a plurality of pages, and each page is recorded with diffractive holographic images so as to record the desired data.

In a holographic recording medium system, in order to identify the data images accurately, at least one fixed area is usually specified in a holographic page, and a special pattern (referred as reference mark (RM) thereinafter) is placed into the fixed area for serving as references of positioning and correcting the holographic images. There are two methods for image positioning and correction. One of the methods is to move at least one specific element in the holographic recording medium system to allow the images to reach an optimal read state, and the other method is to directly calculate image data captured by an image sensor (for example, a CCD) through a digital image processing technique. At least one reference index is required for either of the foregoing two methods. Placing a reference mark RM in a holographic page is the most direct and effective way to obtain corresponding information.

Furthermore, in addition to general data to be recorded, data or information related to the system or the recording medium, such as book address, page address, capacity, or manufacturer information, etc., are also recorded in the holographic recording medium. Such data or information is expected to be correctly identified before the data images are in the optimal read state. Thus, each bit in such data or information is usually expressed with more pixels so that the data or information can be identified more easily than other general data.

A data recovery method is disclosed in U.S. Application No. 2005/0018263. As shown in FIG. 1, a two-dimensional data image 10 is projected on SLM and is stored in a holographic recording medium, and there are four special patterns A, B, C, and D in fixed regions of the holographic recording medium. An data image 12 recorded in the holographic recording medium can be captured by a camera by reading the holographic recording medium, and the four special patterns A, B, C, and D are similarly captured in the data image 12. Compared to the two-dimensional data image 10 projected on SLM, the data image 12 captured by the camera is usually enlarged, reduced, or even twisted due to the design of optical paths of the system and other optical interferences. If the positions of the special patterns A, B, C, and D in the data image 12 captured by the camera can be detected, the data image 12 can be calibrated into an image close to the two-dimensional data image 10 projected on SLM through an interpolation technique (for example, perspective transform or fractional-delay filter interpolation, etc.) based on the correspondence between the positions of the special patterns A, B, C, and D in the data image 12 and the known position information of the special patterns A, B, C, and D in the two-dimensional data image 10. However, the special patterns in this method are only used for calibrating images.

A holographic data storage format is disclosed in U.S. Application No. 2005/0250046. As shown in FIG. 2, the holographic page 20 is divided into a main data recording area 22 and an auxiliary recording area 24. The main data recording area 22 records general data, and the auxiliary recording area 24 records the related information of the holographic page, such as address information. The two areas may have different recording patterns. However, only a conceptual data storage format is provided in this patent to separate the recorded data and the related information thereof, and the data images in the auxiliary recording area cannot be used for calibrating images.

In foregoing two methods, the positioning and calibration of holographic images and the recording of additional information are designed separately. Thus, the system becomes complicated no matter what methods are used. Accordingly, how to simplify the structure of a recording medium and provide an encoding method that can calibrate images and hide information at the same time is one of the most important subjects in the field.

SUMMARY OF THE INVENTION

Accordingly, the present invention is to provide a holographic recording medium and an encoding/decoding method thereof, in which the encoding method can provide information required for calibrating data images and can hide disk information therein.

The present invention provides a holographic recording medium having a plurality of holographic pages. Each of the holographic pages has a plurality of reference mark (RM) placement areas and a plurality of data areas. The RM placement areas are arranged in the holographic page at fixed positions for respectively placing a RM, and the RMs are used for positioning and calibrating images. Each of the data areas is enclosed by at least three RM placement areas. The holographic page is encoded according to the existence of the RMs in these RM placement areas, the patterns of the RMs, and an arrangement of the RMs, so as to store hidden information.

The present invention provides a holographic recording medium having a plurality of RM placement areas arranged in a holographic page of the holographic recording medium. The RM placement areas are used for respectively placing a RM. The holographic page is encoded according to the existence of the RMs in these RM placement areas, patterns of the RMs, and an arrangement of the RMs, so as to store hidden information.

The present invention provides an encoding method of a holographic recording medium. The holographic recording medium comprises a plurality of holographic pages. Hidden information to be encoded by reference marks (RMs) is determined. Then, an encoding pattern is determined and the hidden information is encoded to generate an encoding result. A plurality of RM placement areas is selected from each of the holographic pages according to the encoding result. The corresponding RMs are respectively placed into the selected RM placement areas according to the encoding result.

The present invention also provides a decoding method of a holographic recording medium. The holographic recording medium comprises a plurality of holographic pages. A plurality of RMs in each of the holographic pages is detected. Then, an encoding pattern is obtained according to a detection result of the RMs. The encoding pattern is decoded to obtain the corresponding hidden information.

As described above, according to the encoding structure and encoding method of a holographic recording medium provided by the present invention, the reference marks can be encoded according to the existence of the RMs in the RM placement areas and the patterns of the RMs, and the encoding pattern is corresponded to the information required for the system or the recording medium. Thereby, the RMs are not only used for positioning and calibrating images, but also used for recording information required for the system or the recording medium through an appropriate encoding pattern.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A~3E are schematic diagrams of a holographic page in a holographic recording medium according to the present invention.

DESCRIPTION OF THE EMBODIMENTS

Figure 1:
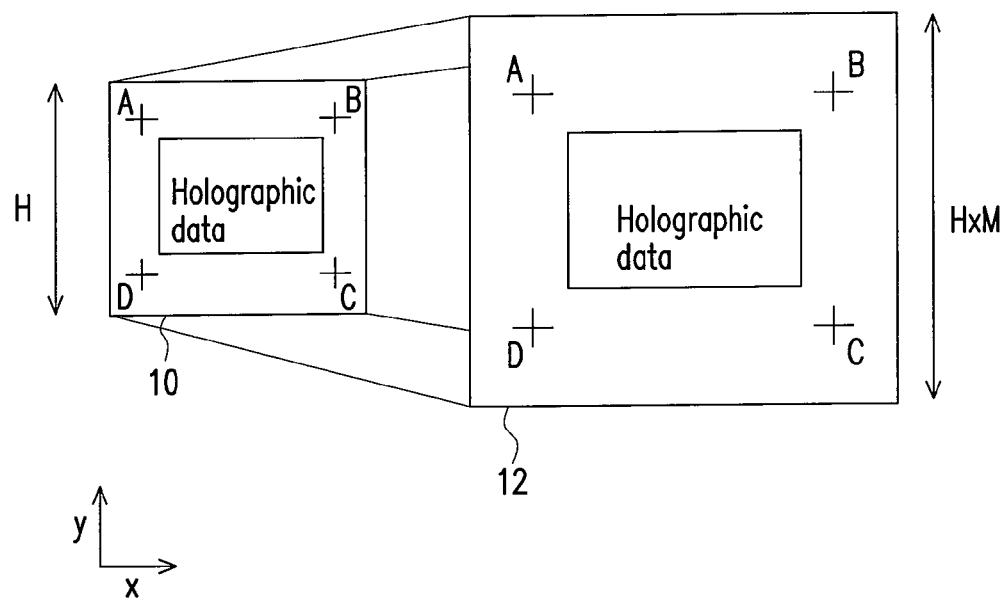
FIG. 1 is a schematic diagram illustrating a conventional data recovery method.
Figure 2:
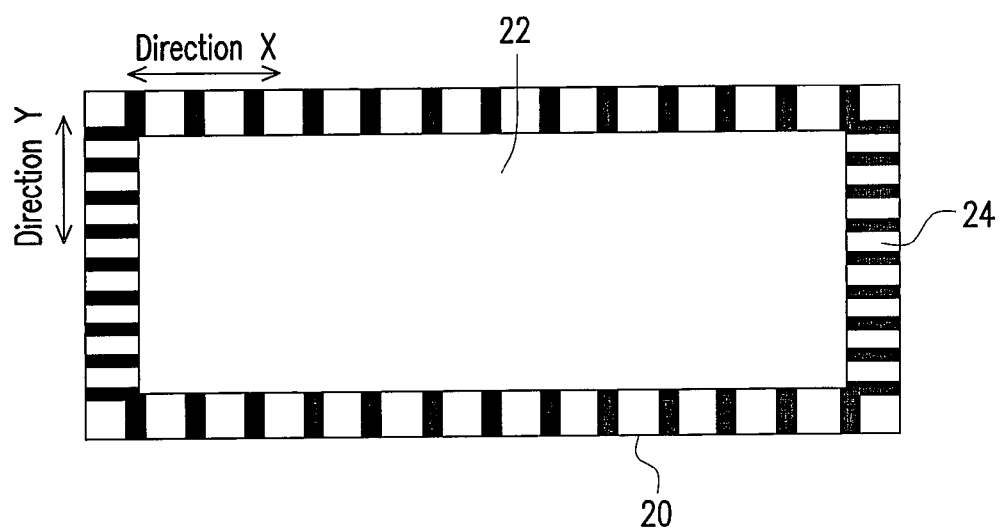
FIG. 2 is a schematic diagram of a conventional holographic data storage format.

Reference will now be made in detail to the present preferred embodiments of the invention, examples of which are illustrated in the accompanying drawings. Wherever possible, the same reference numbers are used in the drawings and the description to refer to the same or like parts.

FIGS. 3A~3E are schematic diagrams of a holographic page in a holographic recording medium according to one embodiment. According to the embodiment, reference marks (RM) are placed in at least one fixed area of a holographic page, and a special encoding method is adopted to store hidden information with different RM arrangement. The hidden information is defined to be data or information related to the system (the holographic recording medium system) and the holographic recording medium, such as book address information, page address information, capacity information, and manufacturer information, etc.

The basic concept of the present embodiment is explained first. As shown in FIG. 3A, a plurality of fixed areas 101 is disposed in a holographic page 100 of a holographic recording medium, and these fixed areas 101 are used for placing reference marks RM. To place the reference marks RM, the fixed areas 101 are selected to place the reference marks RM according to the information to be recorded. A fixed area 101 can be placed with or without the reference marks. In the present embodiment, the holographic page is encoded according to the existence of the reference marks RM therein. For example, "1" represents that a reference mark is placed into the fixed area 101, and "0" represents that no reference mark is placed into the fixed area 101. The areas enclosed by the fixed areas 101 are holographic data areas 102 that are used for recording data.

As shown in FIG. 3A, the same reference marks are placed into all the fixed areas 101. As a result, the encoding result in the holographic page 100 obtained by using the reference mark in the fixed regions 101 is as shown in FIG. 3B, namely, the fixed areas 101 having the reference mark RM are all represented by "1".

Referring to FIG. 3C, the same reference marks are placed into only some of the fixed areas. Accordingly, those fixed areas 111 (denoted with real lines in FIG. 3C) having the reference marks are represented by "1", and those fixed areas 112 (denoted as blank in FIG. 3C) not having the reference mark are represented by "0". As a result, the encoding result in the holographic page 110 obtained by using the reference marks in the fixed areas is as shown in FIG. 3D, namely, the fixed areas are represented by "0" and "1".

As described above, in the present embodiment, the holographic page is encoded according to whether the reference mark is placed in these fixed areas. The encoding method will be further described below.

Next, the data areas in the holographic page are described. Each holographic page of a holographic recording medium further comprises a plurality of data areas, such as the areas 102 in FIG. 3A or the areas 114 in FIG. 3C. The data areas can be determined by the fixed areas. In the examples illustrated in FIG. 3A and FIG. 3B, a data area is determined by four points, i.e., four RMs. Referring to FIG. 3A, fixed areas (i.e. reference marks RM) composed of specific patterns can be identified when the holographic page 100 is read or scanned. Accordingly, the system can realize that the area 102 enclosed by four adjacent fixed areas is a data area.

Referring to FIG. 3C, since only some of the fixed areas 111 are placed with the reference mark RM, those fixed areas that are not placed with the reference mark RM cannot be identified when the holographic page 100 is read or scanned. However, the corresponding locations of the fixed areas can still be deduced through interpolation, and accordingly the data areas can still be obtained according to the pattern of the reference marks RM.

FIG. 3E is a schematic diagram of a holographic pattern in a holographic page, and only two reference marks 122 are illustrated in the holographic page 120. In the fixed areas having the reference marks 122, the dotted holographic pattern is arranged as a triangular pattern. When the holographic page 120 is read, images having the same likelihood are found through an image identification technique, such as cross correlation, so as to find out the locations of the reference marks 122. For example, the reference marks 122 in the fixed areas are arranged in a triangular pattern (denoted with the circles in FIG. 3E). During the image identification process, the triangular pattern in these regions can be clearly identified so that the locations of the reference marks 122 can be determined. The area enclosed by the four reference marks 122 identified in FIG. 3E is determined to be a data area 124.

The data area 124 can be located once the reference marks 122 are identified. In addition, referring to FIG. 3C, the fixed areas that are not placed with the reference marks are not identified. However, the locations of virtual reference marks (i.e., the fixed areas which are not placed with the reference mark) can still be determined through interpolation, and after that, the data areas can be located through the virtual reference marks and the actual reference marks.

As described above, the data area is determined by four adjacent fixed areas. However, the present invention is not limited thereto. For example, a data area can also be determined by three points. In addition, the number of fixed areas for determining a data area can be determined according to the actual design. For example, a data area can be enclosed by four end points among nine adjacent points. Moreover, the foregoing reference mark is not limited to the triangular pattern; instead, the reference mark can be any other suitable pattern.

It can be understood from foregoing description that in the present embodiment, a specific encoding is attached to the reference marks and information is recorded through this specific encoding, so that the reference marks can be used for recording information as well as for positioning and calibrating images. Next, the encoding structure and encoding method of the present invention will be described with several examples.

Figure 4:
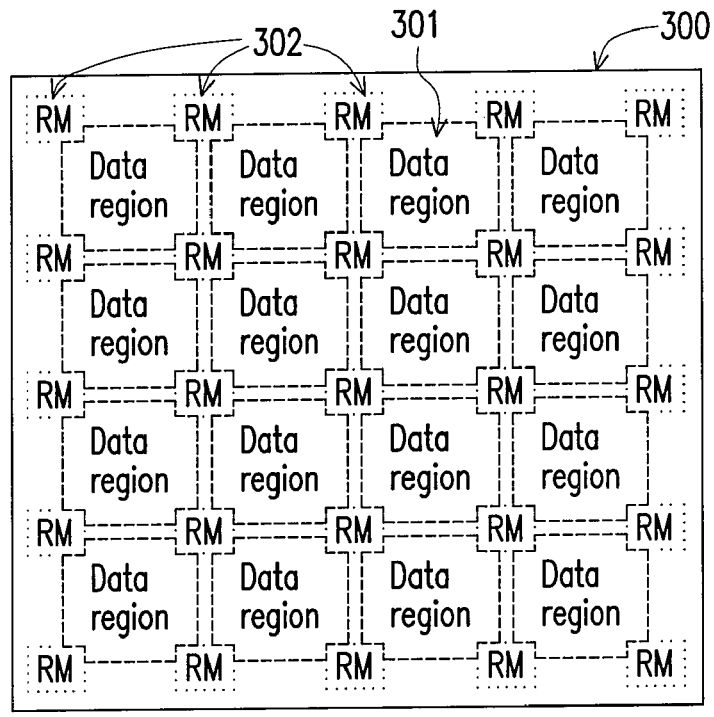
FIG. 4 is a schematic diagram of a holographic recording medium according to an embodiment of the present invention.

FIG. 4 is a schematic diagram of a holographic recording medium according to an embodiment of the present invention, and only a portion of the holographic page is illustrated.

As shown in FIG. 4, the holographic page 300 comprises a plurality of data recording areas (referred as data areas thereinafter) 301 and a plurality of fixed areas (referred as RM placement areas thereinafter) 302 for placing reference marks RM. In the present embodiment, each data area 301 is enclosed by four RM placement areas 302. The data areas 301 are used for recording general data, and the RM placement areas 302 are used for placing encoded reference marks RM.

Figure 5:
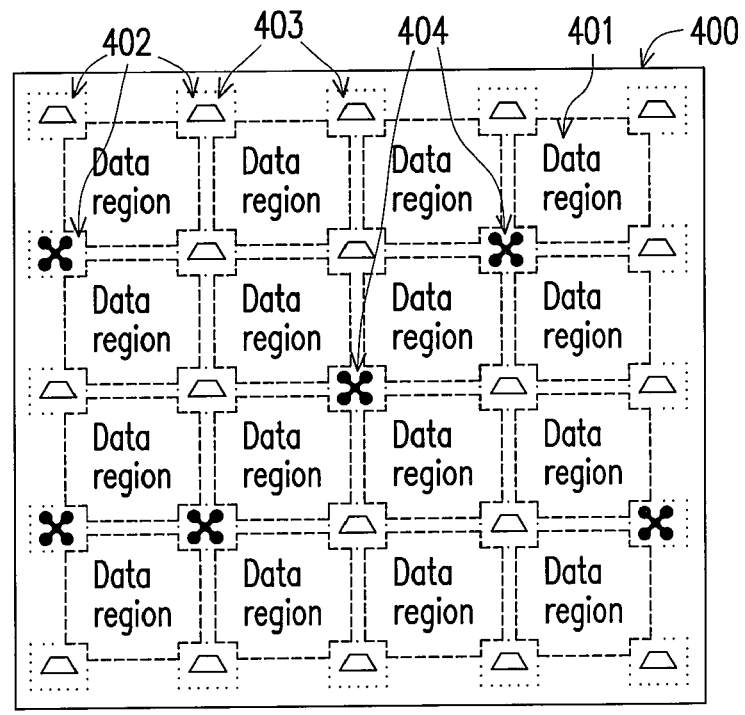
FIG. 5 is a schematic diagram illustrating a holographic recording medium and an encoding method thereof according to an embodiment of the present invention.

FIG. 5 illustrates an example of how a holographic page is encoded. In the example illustrated in FIG. 5, a holographic page is encoded according to the existence of the reference mark. As shown in FIG. 5, the holographic page 400 has a plurality of data area 401 and a plurality of RM placement areas 402. The symbol 403 in FIG. 5 represents that a reference mark is placed, and the symbol 404 represents that no reference mark is placed. Additionally, even though the reference mark is a trapezoid pattern in FIG. 5, the present invention is not limited thereto, and the reference mark can be any other suitable pattern.

Referring to FIG. 5, after a data image is stored into the holographic recording medium, the data image is captured through an image sensor (for example, a CCD). Then, the reference marks RM can be located and identified through an image identification technique (for example, cross correlation, etc.). Those locations not placed with the reference mark RM can be obtained through interpolation or extrapolation according to the identified locations of the reference mark RM. The locations obtained can be referred as locations of virtual reference marks RM. After that, all the locations of the virtual reference marks RM and the actual reference marks RM are integrated into a detected RM location table. The detected RM location table is recorded with the location of each reference mark RM and can be used for image calibration.

As shown in FIG. 5, the data region 401 is enclosed by every four RM areas 402. Thus, the calibrated image of each data area 401 can be obtained through interpolation according to the correspondence between foregoing detected result of the reference mark RM and the existed ideal RM locations in an ideal RM location table, so as to identify data in the data areas 401 subsequently.

As shown in FIG. 5, it is assumed that in the holographic page 400, the area 402 having the reference mark RM 403 is encoded as "1", and the area 402 not having the reference mark RM 404 (the areas marked by "X" pattern in FIG. 5) is encoded as "0". It can be understood from FIG. 5 that the information can be encoded into "1, 1, 1, 1, 1"; "0, 1, 1, 0, 1"; "0, 0, 1, 1, 0"; and "1, 1, 1, 1, 1", etc. from top left to bottom right. Namely, "0" and "1" are used for representing the existence of the reference mark RM.

As described above, whether there is a specific reference mark 402 in a RM area 402 can be determined when the holographic page is read. In this manner, an encoded data string corresponding to the existence of the reference mark RM can be outputted. The system can obtain a hidden information by decoding the encoded data string, and the hidden information is defined as data or information related to the system or the recording medium, such as book address information, page address information, capacity information, and manufacturer information, etc.

Additionally, since the RM placement areas are originally designed for placing the reference marks, the RM placement areas themselves inherently have the function of image calibration. Through the method provided in the present embodiment, the reference marks are allowed to have both the function of image positioning and calibration and the function for hiding information, so that it is not necessary to have two independent designs as in the conventional technique. As a result, through the encoding method of the present embodiment, the performance and the utility of the holographic recording medium are both improved.

Figure 6:
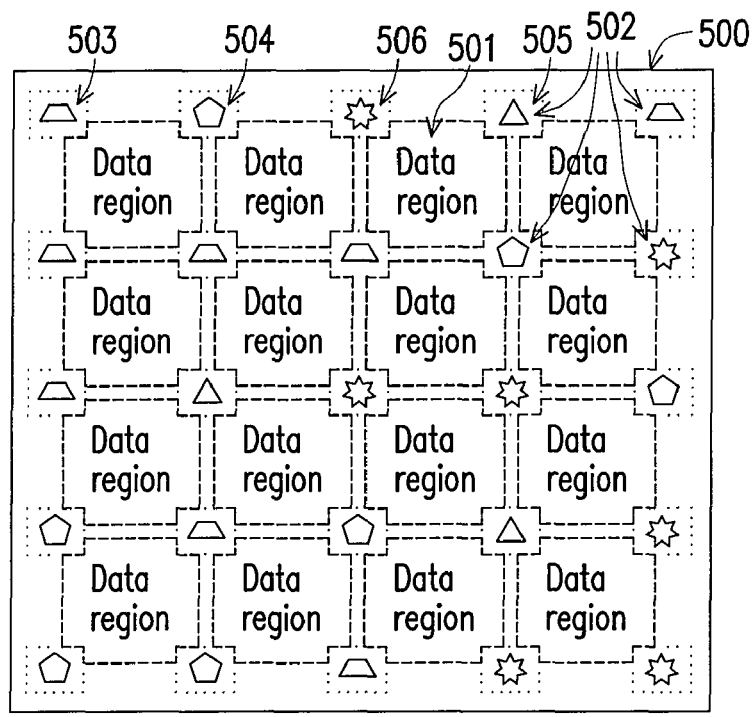
FIG. 6 is a schematic diagram illustrating a holographic recording medium and an encoding method thereof according to another embodiment of the present invention.

FIG. 6 is a schematic diagram illustrating a holographic recording medium and an encoding method thereof according to another embodiment of the present invention. In the example illustrated in FIG. 6, the RM placement areas can adopt different or the same pattern, so as to increase the encoding degree of freedom and the content of the hidden information.

Referring to FIG. 6, the holographic page 500 has a plurality of data areas 501 and a plurality of RM placement areas 502. The symbols 503, 504, 505, and 506 in FIG. 6 represent different RM patterns. In addition, the RM patterns in FIG. 6 are only used for description, but not to limit the present invention. Any other suitable pattern can also be adopted.

As shown in FIG. 6, the holographic page 500 has a plurality of data areas 501 and a plurality of RM placement areas 502. The RM patterns can be placed into the RM placement areas 502, and have RM_type1 (503), RM_type2 (504), RM_type3 (505), and RM_type4 (506). Same as the embodiment described above, an ideal RM location table can also be established according to the RM placement areas 502.

When the holographic page is encoded according to the types of the reference marks, it is assumed that RM_type1 (503) represents "0", RM_type2 (504) represents "1", RM_type3 (505) represents "2", and RM_type4 (506) represents "3". In the present embodiment, "0" represents a specific RM pattern instead of a RM placement area not placed with the reference mark.

Referring to FIG. 6, the holographic page is encoded into "0, 1, 3, 2, 0"; "0, 0, 0, 1, 3"; "0, 2, 3, 3, 1"; "1, 0, 1, 2, 3"; "1, 1, 0, 3, 3" from top left to bottom right. According to the types and disposition of the reference marks in the present embodiment, the reference marks have much more arrangements than that in the embodiment illustrated in FIG. 5. Accordingly, more information or messages could be hidden therein.

Referring to FIG. 6, after a data image is stored into a holographic recording medium, the data image is captured through an image sensor (for example, a CCD). Then, the reference marks RM can be located and identified through an image identification technique, and the locations of the reference marks can form a table which records the locations of all the reference marks and can be used for calibrating images.

Additionally, the data area 501 is enclosed by every four RM areas 502. Thus, a calibrated image of each data area 501 can be obtained through interpolation according to the correspondence between foregoing table and the ideal RM location table, so as to identify data stored in the data area 501 subsequently.

Moreover, because the reference marks RM in the holographic page 500 have been identified through foregoing process, the information hidden in the reference marks RM can be restored by decoding the reference marks.

Similarly, because the reference marks themselves have the function of image calibration, the reference marks can be allowed to have both the function for positioning and calibrating images and the function for hiding information through the method in the present embodiment, so that it is not necessary to have two independent designs as in the conventional technique. Accordingly, the performance and the utility of the holographic recording medium are both improved. In addition, since many different RM patterns are adopted, the hidden information or data recorded therein is further increased through the encoding method in the present embodiment.

Figure 7:
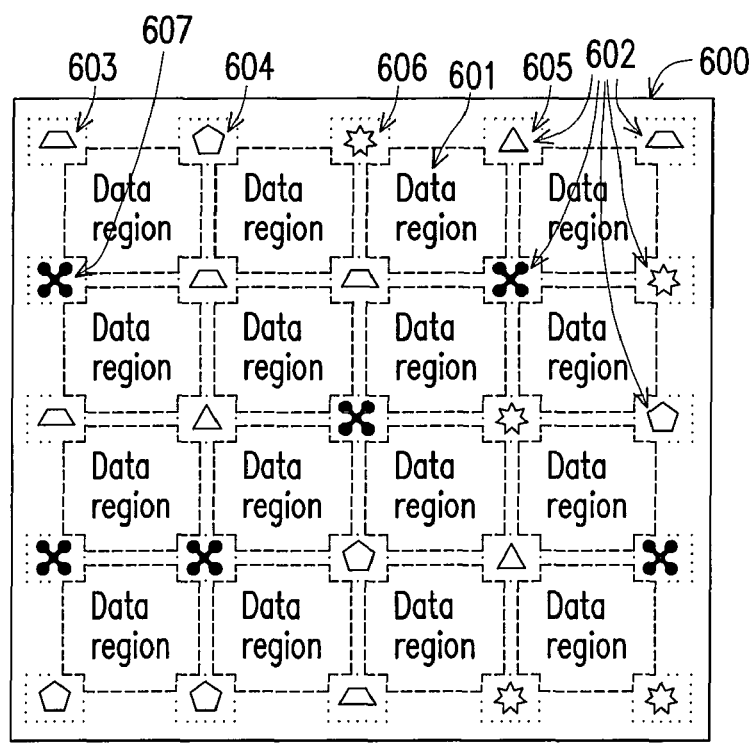
FIG. 7 is a schematic diagram illustrating a holographic recording medium and an encoding method thereof according to yet another embodiment of the present invention.

FIG. 7 is a schematic diagram illustrating a holographic recording medium and an encoding method thereof according to yet another embodiment of the present invention. In the example illustrated in FIG. 7, different or the same pattern can be placed in the RM placement areas so as to increase the encoding degree of freedom and the content of the hidden information. The difference between the present embodiment and the embodiment illustrated in FIG. 6 is that the RM placement areas 602 which are not placed with reference marks are encoded as "0".

As shown in FIG. 7, the holographic page 600 comprises a plurality of data areas 601 and a plurality of RM placement areas 602. The RM placement areas 602 can be placed with different reference marks or without any reference mark. Accordingly, in the present embodiment, the RM patterns can be placed into the RM placement areas 602, and have RM_type1 (603), RM_type2 (604), RM_type3 (605), RM_type4 (606), and non-existing RM (607).

Similarly, in the present embodiment, the holographic page is encoded according to the types of the reference marks and the existence thereof, and it is assumed that non-existing RM (607) represents "0", RM_type1 (603) represents "1", RM_type2 (604) represents "2", RM_type3 (605) represents "3", and RM_type4 (606) represents "4". Then as shown in FIG. 7, the holographic page is encoded as "1, 2, 4, 3, 1"; "0, 1, 1, 0, 4"; "1, 3, 0, 4, 2"; "0, 0, 2, 3, 0"; "2, 2, 1, 4, 4" from top left to bottom right. Through such RM arrangement, much more results can be obtained compared to the embodiments illustrated in FIG. 5 and FIG. 6. Accordingly, more information or messages can be hidden therein. Similarly, the reference marks in the holographic page 600 can also be used for calibrating images. The other parts of the present embodiment are similar to those in foregoing embodiments therefore will not be described herein.

As described in foregoing embodiments, in a holographic page, at least one special pattern is placed in at least one fixed area for positioning or calibrating images, and this special pattern is arranged through a specific encoding method so as to hide related information.

Additionally, in foregoing embodiments, the holographic page is encoded from left to right and from top to bottom. However, the present invention is not limited thereto, and different encoding sequence can be adopted.

Figure 8A:
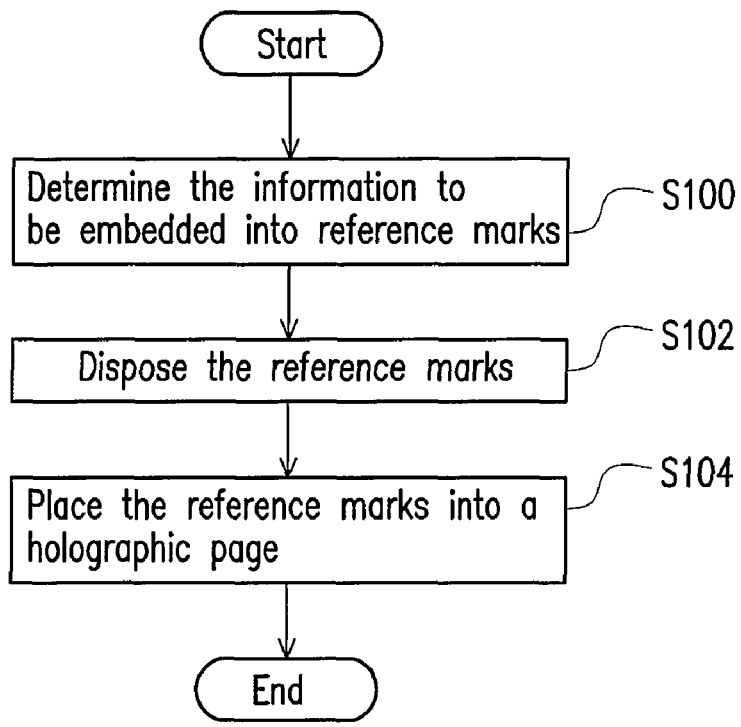
FIG. 8A is a schematic flowchart of an encoding method of a holographic recording medium according to the present invention.

FIG. 8A is a schematic flowchart of an encoding method of a holographic recording medium according to the present invention. In step S100, information to be embedded into the reference mark, such as book address information, page address information, capacity information, and manufacturer information, etc., is determined. Then, an encoding method for encoding the information to be embedded into the reference mark is determined. The encoding method can be referred to the aforementioned embodiments. For example, the information to be embedded into the reference mark can be encoded according to the existence of the reference mark (as "0" and "1" in FIG. 5). The reference mark is placed into the RM regions according to foregoing encoded result. In addition, the examples illustrated in FIG. 6 and FIG. 7 can also be adapted to place different RM patterns into the RM placement areas.

In step S102, the reference mark is placed. The RM placement areas in the holographic page are arranged at fixed locations. The reference mark is disposed according to the result obtained in step S100. Assuming that the information to be embedded into the reference mark is encoded through the method illustrated in FIG. 5, the system can determine which RM placement area is to be placed with the reference mark and which RM placement area is not to be placed with the reference mark, so as to allow the reference marks in the RM placement areas to be corresponding to the encoding result.

Moreover, if the information to be embedded into the reference mark is encoded through the method illustrated in FIG. 6 or FIG. 7, the types of reference marks to be placed into the RM regions and which RM regions are to be placed with the reference marks are configured so as to allow the RM patterns in the RM placement areas to be corresponding to the encoding result.

In step S104, the reference mark is placed into the holographic page. After the arrangement in step S102 is completed, the corresponding RM patterns are placed (written) into the RM placement areas of the holographic page according to the above arrangement result. In this manner, the placement and encoding of the reference marks are completed.

Figure 8B:
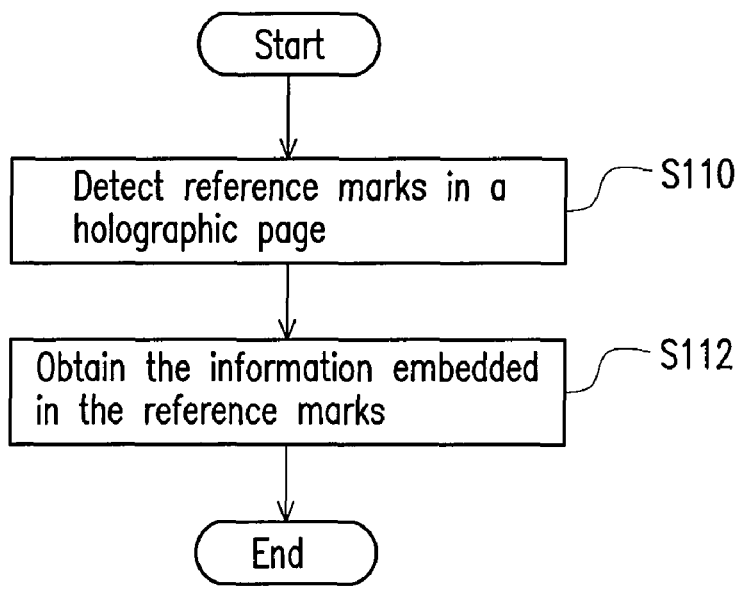
FIG. 8B is a schematic flowchart of a decoding method of a holographic recording medium according to the present invention.

FIG. 8B is a schematic flowchart of a decoding method of a holographic recording medium according to the present invention. In step S110, the reference marks in the holographic page are detected. For example, the data image is captured by using an image sensor (for example, CCD). Then, the reference marks can be located and identified through an image identification technique, such as cross correlation. Accordingly, whether there are reference marks placed in the RM placement areas and the types of the reference marks can be determined.

Thereafter, in step S112, the information to be embedded into the reference mark is obtained. The corresponding encoding can be obtained as shown in FIGS. 5~7 after whether there are reference marks placed and the types of the reference marks in the RM placement areas are determined. After that, the encoded data is transmitted to a decoder circuit to obtain the corresponding information. In other words, the information or data related to the system or the recording medium can be obtained through the identification and reading of the reference marks.

In summary, according to the encoding structure and encoding method of the holographic recording medium provided by the present invention, a holographic page can be encoded according to the existence of reference marks in the RM placement areas and the types of the reference marks, and the encoding is corresponding to the information required by the system or the recording medium. Thereby, through the method in the present invention, the reference marks can be used for recording information related to the system or the recording medium in addition to positioning and calibrating images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A holographic recording medium, comprising:
    a plurality of holographic pages, each of the holographic pages further comprising:
        a plurality of reference mark (RM) placement areas, arranged in the holographic page at fixed positions for respectively placing a RM, wherein the RM is used for positioning and calibrating images; and
        a plurality of data areas, wherein each of the data areas is enclosed by at least three of the RM placement areas,
    wherein the reference marks are encoded according to the existence of the RMs in the RM placement areas, patterns of the RMs, and an arrangement of the RMs, so as to store a hidden information.

2. The holographic recording medium according to claim 1, wherein the RMs have the same pattern.

3. The holographic recording medium according to claim 1, wherein the RMs have more than one pattern.

4. The holographic recording medium according to claim 1, wherein the hidden information comprises book address information and page address information.

5. The holographic recording medium according to claim 1, wherein the hidden information comprises information related to the holographic recording medium and a holographic recording medium system.

6. A holographic recording medium, comprising:
    a plurality of reference marks (RMs) placement areas, arranged in a holographic page of the holographic recording medium for respectively placing a RM,
    wherein the reference marks are encoded according to the existence of the RMs in the RM placement areas, patterns of the RMs, and an arrangement of the RMs, so as to store a hidden information.

7. The holographic recording medium according to claim 6, wherein the RMs have the same pattern.

8. The holographic recording medium according to claim 6, wherein the RMs have more than one pattern.

9. The holographic recording medium according to claim 6, wherein the hidden information comprises book address information and page address information.

10. The holographic recording medium according to claim 6, wherein the hidden information comprises information related to the holographic recording medium and a holographic recording medium system.

11. An encoding method of a holographic recording medium, wherein the holographic recording medium comprises a plurality of holographic pages, the encoding method comprising:
    determining a hidden information to be encoded by reference marks (RMs);
    determining an encoding pattern, and encoding the hidden information to generate an encoding result;
    selecting a plurality of RM placement areas in each of the holographic pages according to the encoding result; and
    respectively placing the corresponding RMs into the selected RM placement areas according to the encoding result.

12. The encoding method according to claim 11, wherein the encoding pattern is determined according to the existence of the RMs.

13. The encoding method according to claim 11, wherein the encoding pattern is determined according to the patterns of the RMs.

14. The encoding method according to claim 13, wherein the RMs have the same pattern.

15. The encoding method according to claim 13, wherein the RMs have a plurality of patterns.

16. The encoding method according to claim 11, wherein the hidden information comprises book address information and page address information.

17. The encoding method according to claim 11, wherein the hidden information comprises information related to the holographic recording medium and a holographic recording medium system.

18. A decoding method of a holographic recording medium, wherein the holographic recording medium comprises a plurality of holographic pages, the decoding method comprising:
    detecting a plurality of reference marks (RMs) in each of the holographic pages;
    obtaining an encoding pattern according to a detection result of the RMs; and
    decoding the encoding pattern to obtain a corresponding hidden information.

19. The decoding method according to claim 18, wherein the encoding pattern is determined according to the existence of the RMs.

20. The decoding method according to claim 18, wherein the encoding pattern is determined according to the patterns of the RMs.

21. The decoding method according to claim 20, wherein the RMs have the same pattern.

22. The decoding method according to claim 20, wherein the RMs have a plurality of patterns.

23. The decoding method according to claim 18, further comprising an image calibration step, and the image calibration step further comprising:
    obtaining RM placement locations of the RMs;
    calculating the RM placement locations not placed with the RMs through an algorithm, so as to find all RM placement locations;
    calibrating images in a plurality of data areas enclosed by all the RM placement locations according to all the RM placement locations through a numerical method.

24. The decoding method according to claim 23, wherein the algorithm comprises an interpolation or an extrapolation.

25. The decoding method according to claim 23, wherein the numerical method comprises an interpolation or an extrapolation.

26. The decoding method according to claim 18, wherein the hidden information comprises book address information and page address information.

27. The decoding method according to claim 18, wherein the hidden information comprises information related to the holographic recording medium and a holographic recording medium system.

* * * * *